United States Patent [19]
Kullmann et al.

[11] Patent Number: 6,026,643
[45] Date of Patent: Feb. 22, 2000

[54] MASTER CYLINDER

[75] Inventors: Bernhard W. Kullmann, Ortonville; Kevin J. Gallagher, Waterford; Kevin K. Lee, Shelby Township; Eric M. Formiller, New Baltimore, all of Mich.

[73] Assignee: ITT Manufacturing Enterprises, Inc., Wilmington, Del.

[21] Appl. No.: 08/991,702

[22] Filed: Dec. 16, 1997

[51] Int. Cl.[7] ....................................................... F15B 7/00
[52] U.S. Cl. ................................. 60/533; 60/585; 92/142; 92/163
[58] Field of Search ........................... 60/533, 546, 585, 60/588; 92/142, 163

[56] References Cited

U.S. PATENT DOCUMENTS

| | | | |
|---|---|---|---|
| 4,294,072 | 10/1981 | Flynn | 60/585 |
| 4,472,943 | 9/1984 | Grabill . | |
| 4,565,066 | 1/1986 | Weiler et al. | 60/585 |
| 5,027,598 | 7/1991 | Meynier . | |
| 5,036,664 | 8/1991 | Camm | 60/588 |
| 5,161,375 | 11/1992 | Crumb et al. . | |
| 5,349,820 | 9/1994 | Yanagi et al. . | |

*Primary Examiner*—F. Daniel Lopez
*Attorney, Agent, or Firm*—Rader, Fishman & Grauer PLLC

[57] ABSTRACT

To provide a hydraulic master cylinder with inlet ports and outlet ports arranged in an angle to each other wherein the outlet ports can be on either side of the housing without the need of two different casts, the master cylinder according to the invention is equipped with either two sets of protrusions adapted to be machined into inlet ports or two sets of protrusions adapted to be machined into outlet ports. The two sets of identical protrusions are arranged symmetrically with respect to the one set of different protrusions. Thus, depending on the desired side of the outlet ports, only one set of the two sets of identical protrusions is machined while the other set remains an unmachined accumulation of material.

6 Claims, 2 Drawing Sheets

MASTER CYLINDER

BACKGROUND OF THE INVENTION

The present invention relates to a master cylinder for a hydraulic system such as a brake system or a clutch system. Such a master cylinder usually includes a set of inlet ports connected to a fluid supply reservoir and a set of outlet ports connected to a slave cylinder. The master cylinders for brake and clutch usually are pedal-actuated which means that these cylinders are located in the front on that side of the engine of the car where the driver is placed.

Regarding the limited space under the hood of a vehicle, it is evident that, for space-saving reasons, there is only one optimum way to arrange inlet ports and outlet ports with respect to each other since they have to be connected to a voluminous reservoir and fluid lines, respectively. In general, in right-hand driven cars the master cylinders are constructed just in specular symmetry to the master cylinders for left-hand driven cars. Therefore, it is necessary to cast two different types of master cylinders for each car model that is manufactured both as a left-hand drive and as a right-hand drive version which causes high costs. Especially for car models running in small numbers, it is desirable to have one master cylinder type fitting both car versions.

A master cylinder according to U.S. Pat. No. 5,349,820 achieves this result by arranging two inlet ports and two outlet ports in a line in an alternating order. Depending on the location of the fluid supply reservoir, two tubes of variable shape are attached to the inlet ports by means of a flange portion. Thus, the ports of the tubes can point to any desired direction. Such an assembly makes it possible to use the same cast of a master cylinder housing for different arrangements. A disadvantage, however, is a great assembling expenditure due to a number of additional parts used to achieve multiple port locations.

OBJECT OF THE INVENTION

An object of the present invention is to provide a universal hydraulic master cylinder which, with only one cast, fits for left-hand driven vehicles as well as for right-hand driven vehicles.

Another object of the invention is to provide a hydraulic master cylinder which does not require an increased number of parts to assemble.

A further object of the invention is to provide a universal hydraulic master cylinder which does not require additional time for machining.

SUMMARY OF THE INVENTION

These objects are achieved by a master cylinder with a housing featuring two sets of first protrusions and one set of second protrusions wherein the sets of first protrusions are arranged substantially symmetrically with respect to the second protrusions. The finished master cylinder then has one set of first protrusions left unmachined while the other set of first protrusions and the set of second protrusions are machined to provide inlet ports and outlet ports.

According to the invention, the cast housing can provide doubled protrusions for either type of ports. A brake master cylinder including two machined inlet ports on its top and two machined outlet ports on one of its sides usually is positioned rather close to the vehicle engine which sometimes makes it impossible to provide another set of protrusions for a set of outlet ports on the other side. In this case, it is recommended to form two sets of protrusions for inlet ports. The master cylinder can be rotated about its longitudinal axis to position that set of inlet protrusions on its top from which the outlet protrusions are located on the desired side.

The master cylinder becomes even easier to manufacture if the second set of protrusions assigned to form the outlet ports is arranged at an angular offset of 90° from each of the two sets of inlet protrusions. Thus, the inlet protrusions are exactly 180° apart, and the means for mounting or fixing the master cylinder can have a very simple design, for instance with two or another even number of holes for screws or rivets in pairs of holes arranged at an offset of 180° with respect to the cylinder axis.

The fixing flange is no issue at all if, presuming the location of the inlet port is on the top of the master cylinder, two sets of outlet protrusions are provided, one on each side of the inlet protrusions. In this case, no rotation of the cylinder is necessary. In addition to the inlet protrusions, merely the set of outlet protrusions located on the desired side is machined.

However, a vehicle usually provides much more space for a second set of inlet protrusions under the master than for a second set of outlet protrusions on the side of the master cylinder where for instance the engine is mounted.

DETAILED DESCRIPTION OF THE DRAWINGS

Figure 1:
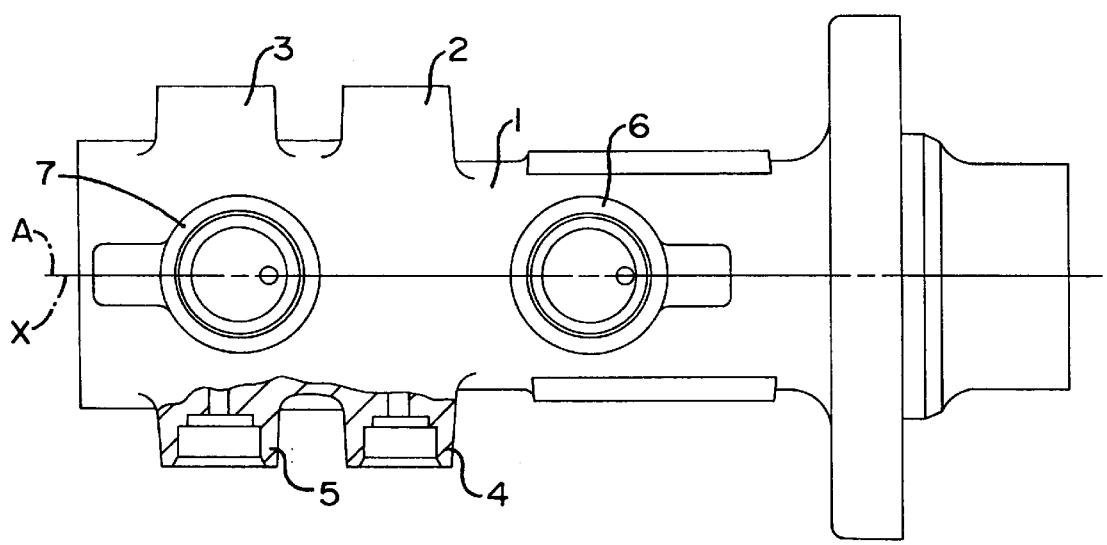
FIG. 1 shows a top view of a master brake cylinder providing two sets of protrusions adapted for machining outlet ports.
Figure 2:
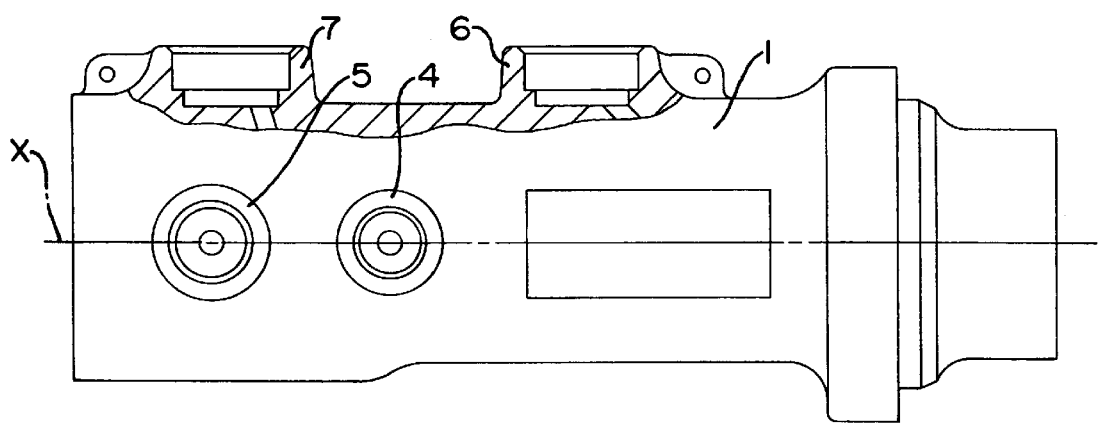
FIG. 2 shows a side view of the master cylinder according to FIG. 1.

In FIGS. 1 and 2, a master brake cylinder is shown which substantially is constructed in specular symmetry to a plane A extending vertical to the paper plane in FIG. 1 and in the paper plane in FIG. 2. The cylinder housing 1 has a substantially tubular shape with a central longitudinal axis x along the line defined by the intersection of plane A and the paper plane in FIG. 1. Two identical sets of two outlet protrusions 2, 3 and 4, 5, respectively, are arranged on the mantle surface of the housing at an angular offset of 180°, the protrusions of each set being in line along the axis x. A set of two inlet protrusions 6 and 7 is located in the middle between the pairs of outlet protrusions 2, 3 and 4, 5 on the mantle surface of the housing 1.

Only one pair of outlet protrusions 4 and 5 and the pair of inlet protrusions 6 and 7 are machined as outlet ports and inlet ports, respectively. The other pair of outlet protrusions 3 and 2 remains unmachined as accumulations of massive metal. The choice of the pair of outlet protrusions to be machined depends on the vehicle type the master cylinder is used for. Due to the fact that the outlet ports can be machined on either side of the master cylinder, the cylinder can be mounted in the same orientation for all purposes.

Figure 3:
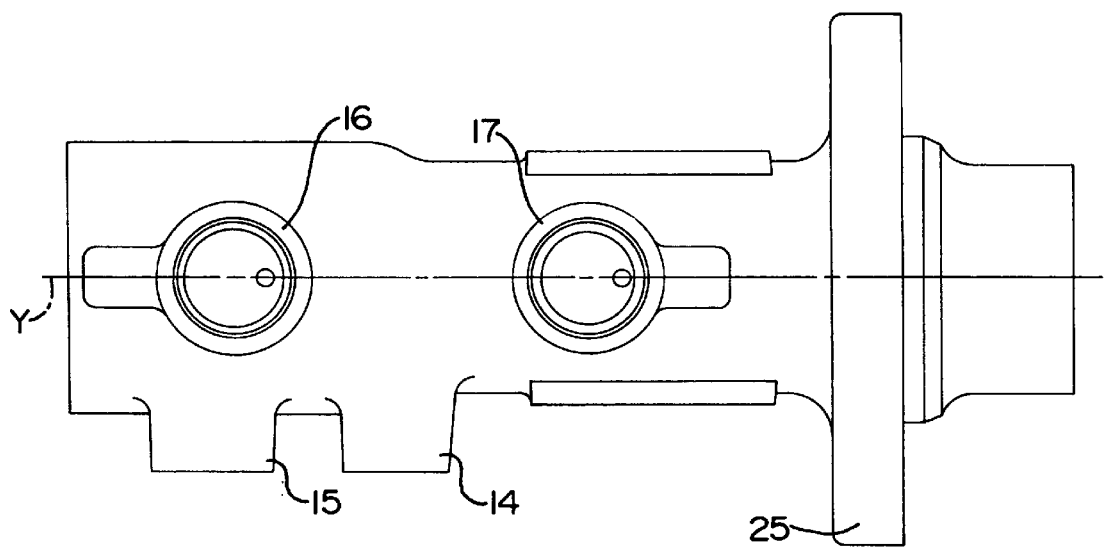
FIG. 3 shows a top view of a master brake cylinder providing two sets of protrusions adapted for machining inlet ports.
Figure 4:
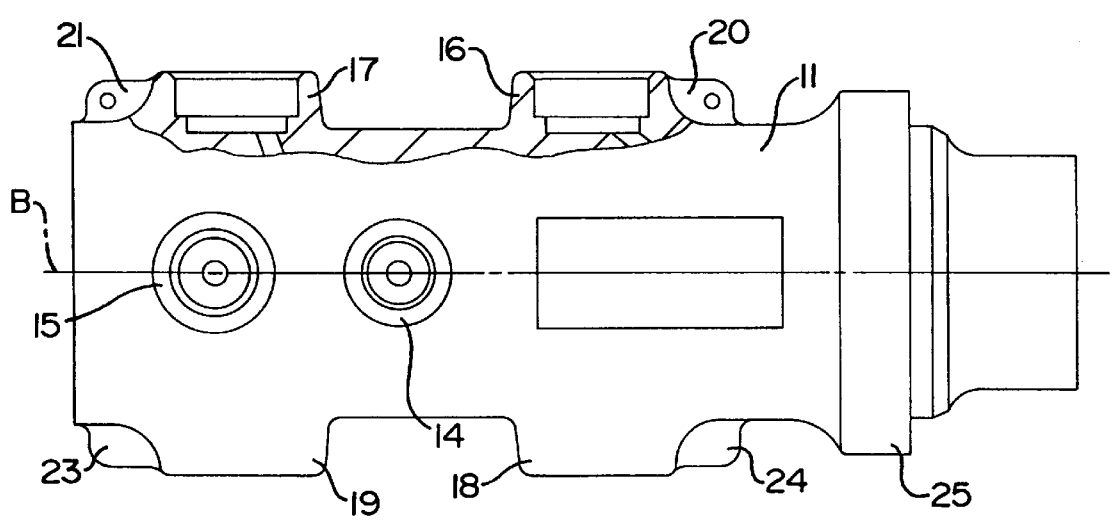
FIG. 4 shows a side view of the master cylinder according to FIG. 3.

The master brake cylinder according to FIGS. 3 and 4 comprises two identical sets of inlet protrusions 16, 17 and 18, 19 instead of two sets of outlet protrusions. The master brake cylinder is constructed in specular symmetry to a plane B extending in the paper plane in FIG. 3 and vertical to the paper plane in FIG. 4. The cylinder housing 11 has a substantially tubular shape with a central longitudinal axis y along the line defined by the intersection of plane B and the paper plane in FIG. 4. The two sets of two inlet protrusions 16, 17 and 18, 19, respectively, are arranged on the mantle surface of the housing at an angular offset of 180°, the protrusions of each set being in line along the axis y. A set of two outlet protrusions 14 and 15 is located in the middle between the pairs of inlet 16, 17 and 18, 19 on the mantle surface of the housing 11.

Only one pair of inlet protrusions 16 and 17 and the pair of outlet protrusions 14 and 15 are machined as inlet ports and outlet ports, respectively. The other pair of inlet protrusions 18 and 19 remains unmachined as accumulations of massive metal. The choice of the set of inlet protrusions to be machined depends on the desired side of the outlet ports since the inlet ports normally are supposed to be located on top of the master cylinder. Accordingly, the housing of the master cylinder can be mounted in two positions, either having the protrusions 16 and 17 on its top as shown, or with the protrusions 18 and 19 on its top which the are machined instead of the protrusions 16 and 17.

Two identical sets of fixing flanges 20, 21 and 23, 24 are formed on the housing 11. They are arranged in axial symmetry to each other, i.e. the set of flanges 20 and 21 is rotated relative to the flanges 22 and 23 by 180° about the axis y. It may also be advisable to provide another fixing means on the flange 25 extending perpendicular to the axis y, for instance in the form of drilled holes. In this case, pairs of holes located 180° apart can be used for both mounting postions. If the two sets of inlet protrusions 16, 17 and 18, 19 are dislocated by a different angle, the sets of fixing means of what shape and location ever must have the same angular offset from each other to provide an appropriate fixation in either angular position.

The present invention is not limited to the embodiments shown which are just special examples of substantially symmetrical master cylinders. The angle of symmetry does not necessarily have to be 180° but can be chosen at will.

While the master cylinders shown are tandem master cylinders for a brake system, the invention is also applicable to master cylinders for other purposes, such as hydraulic clutches, as the number of protrusions per set can as well be one, three or more.

Finally, the interior of the master cylinder is of no importance for the invention. Master cylinders including so-called central valves can be manufactured according to the invention as well as master cylinders with plunger pistons. They do not have to be pedal-actuated or acted on by a booster, but can also be motor-driven or by any other means.

We claim:

1. A master cylinder housing comprising:

a set of machined first protrusions forming ports, a set of machined second protrusions forming ports and a set of unmachined first protrusions arranged substantially in symmetry to the set of machined first ports with respect to the set of second ports.

2. The master cylinder housing of claim 1 having a longitudinal axis about which the two sets of first protrusions are arranged in an angle of 180°.

3. The master cylinder housing of claim 2 comprising fixing means arranged in axial symmetry with respect to the longitudinal axis.

4. The master cylinder housing of claim 1 wherein the first protrusions are inlet protrusions and the second protrusions are outlet protrusions.

5. The master cylinder housing of claim 1 wherein the first protrusions are outlet protrusions and the second protrusions are inlet protrusions.

6. Method to manufacture a master cylinder housing including the following steps:

casting a master cylinder housing with two identical sets of first protrusions and one set of second protrusions, the sets of first protrusions being arranged substantially in specular symmetry with respect to the set of second protrusions;

machining the set of second protrusions and one of the sets of first protrusions into hydraulic ports and leaving the other set of first protrusions unmachined.

\* \* \* \* \*